Nov. 11, 1952
W. T. HONISS
2,617,696
THRUST AND RADIAL SUPPORTING BEARING
Filed June 22, 1950
2 SHEETS—SHEET 1
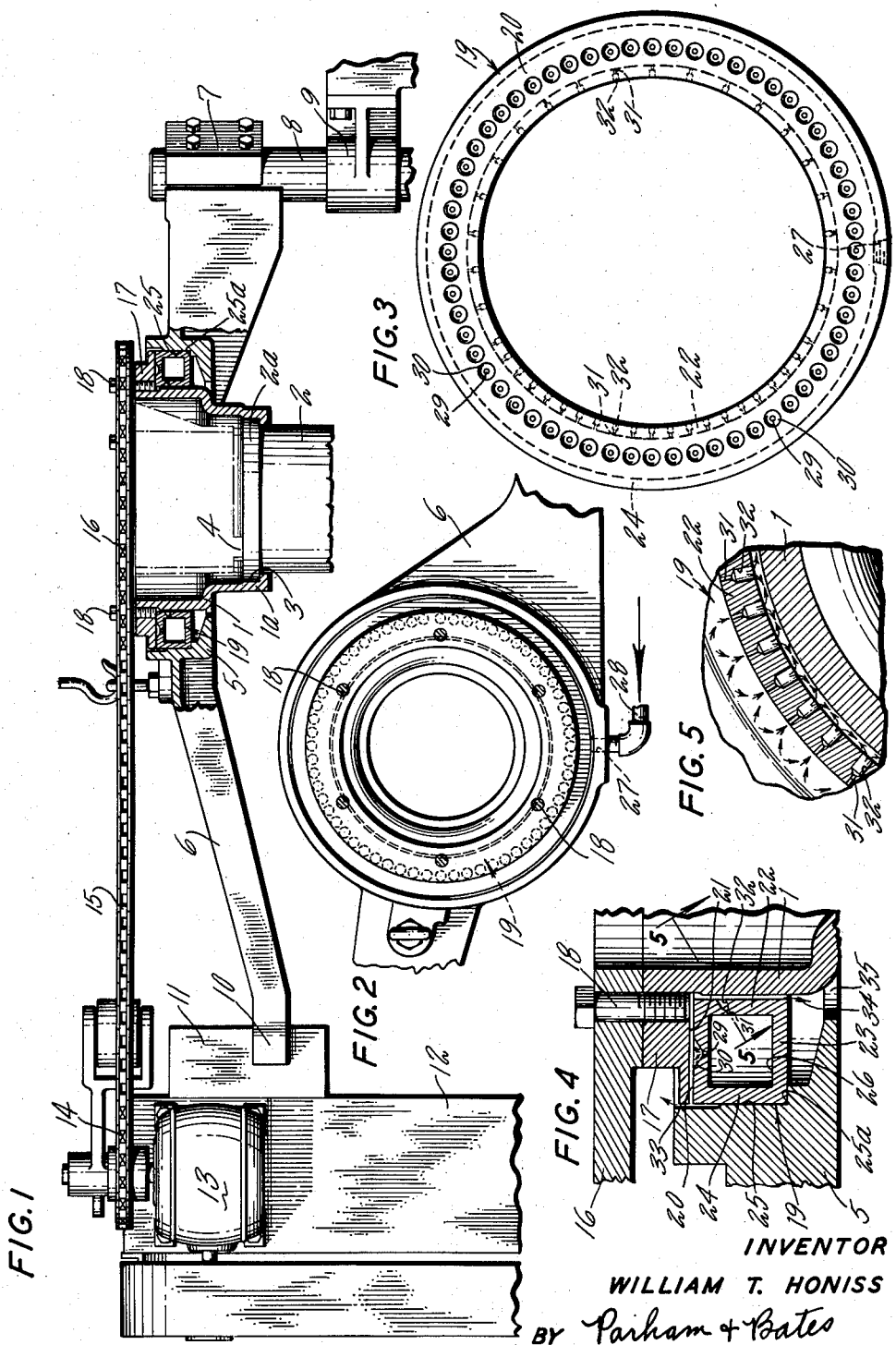
INVENTOR
WILLIAM T. HONISS
BY Parham & Bates
ATTORNEYS

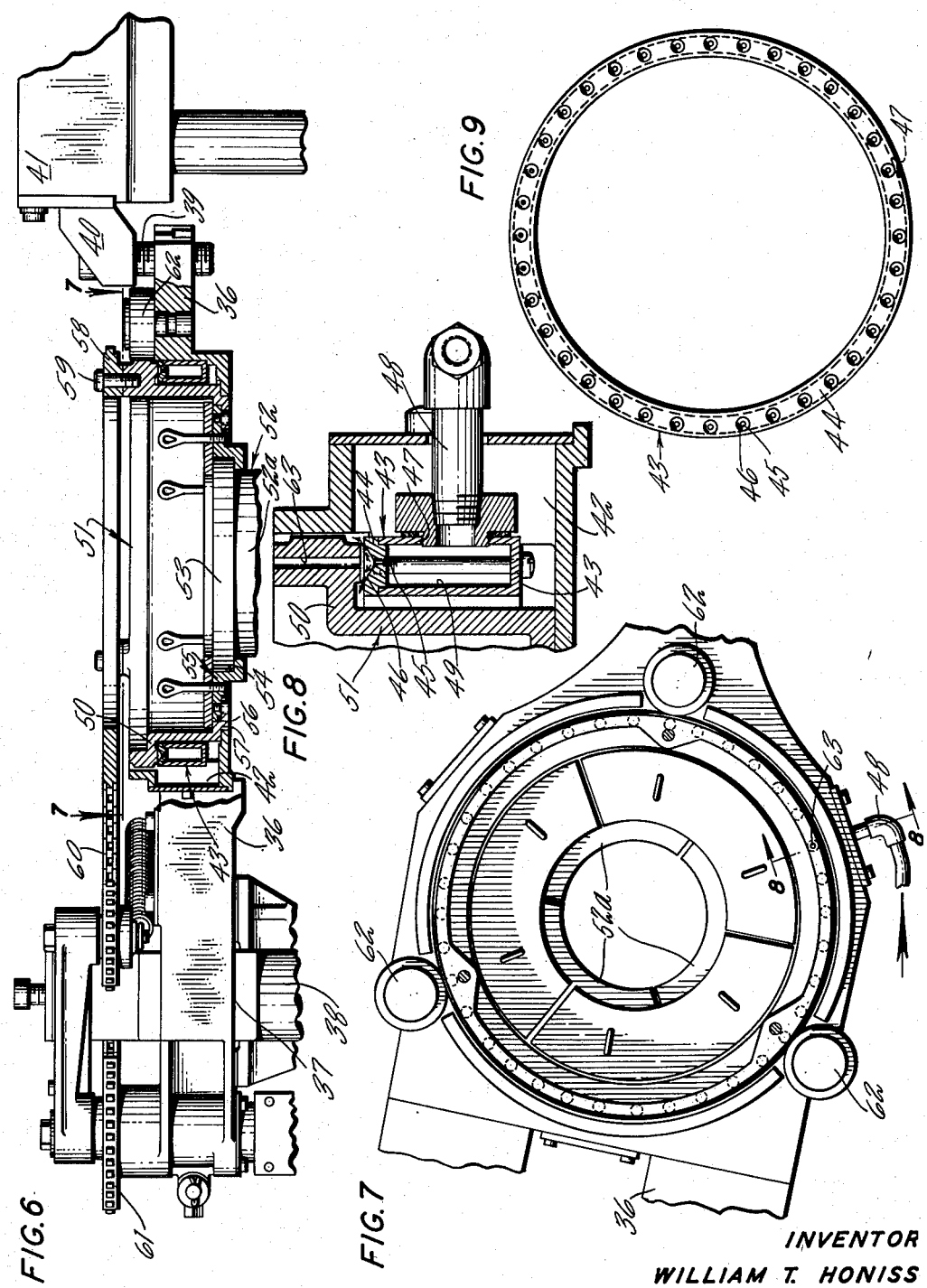

Patented Nov. 11, 1952

2,617,696

UNITED STATES PATENT OFFICE 2,617,696

THRUST AND RADIAL SUPPORTING BEARING

William T. Honiss, West Hartford, Conn., assignor to Emhart Manufacturing Company, a corporation of Delaware Application June 22, 1950, Serial No. 169,717

5 Claims. (Cl. 308—9)

This invention relates generally to improvements in bearings for rotary vertical tubes or like rotary elements and more particularly to a bearing for a rotary holder of a refractory tube of a glass feeder.

A glass feeder of a well known type employs a rotary refractory tube to effect a stirring or circulatory movement of molten glass in a feed bowl containing such glass and into which the tube depends. The tube is supported at its upper end rotatably in a bearing in an overhanging arm, such bearing necessarily being located in a zone of high temperature where it is subjected also to an oxidizing atmosphere. Because of these service conditions, bearings making use of metallic balls or rollers in a known manner for antifrictionally supporting the holder of such a tube in the overhanging supporting arm have in general been unsatisfactory because of rapid wear, deterioration and failure in service. It is not possible to use known lubricants for such bearings because of the heat to which they are exposed. Attempts to keep such bearings cool by applying cooling air thereto have not completely solved the difficulty as the combination of high temperature and oxidizing action tends to reduce the surface portions of the relatively moving contacting parts to a highly abrasive powder which facilitates wear on the relatively moving parts. The balls or rollers may be "seized" and this may lead to uneven wear on the rotating holder as it turns on the "seized" bearing elements. This in turn has frequently necessitated costly replacement of parts extending beyond the actual bearings.

An object of the present invention is to provide efficient, reliable and durable bearing means for the rotary holders of refractory tubes of glass feeders or like parts.

I have discovered that by providing suitable jets of air so as to form a bearing air cushion or film between a supported portion of the rotary holder of a refractory tube of a glass feeder or the like and a stationary supporting part in relation to which the holder rotates, wear on the relatively rotating parts will be eliminated and the holder and its supported tube can be rotated anti-frictionally without deterioration of parts in the hot oxidizing atmosphere to which these parts are subjected. Moreover, the bearing air serves the further function of cooling the relatively rotating and adjacent parts and this at no greater cost than that of the air previously used solely for cooling the parts of prior arrangements for supporting rotary tube holders of glass feeders by use of metallic bearing elements.

A more specific object of the invention therefore is to provide a practical means to rotatably support a holder of a refractory tube of a glass feeder by the use of air as the effective bearing element. Such means also may include provisions according to the invention to use air to maintain the holder centered against a lateral pull thereon by the means for rotating it.

Other objects and advantages of the invention hereinafter will be pointed out or will become apparent from the following description of practical embodiments of such invention as shown in the accompanying drawings, in which:

Figure 1 is a view, mainly in elevation, of fragmentary parts of a supporting and rotating mechanism for a refractory tube of a glass feeder equipped with an air bearing of the present invention, the air bearing and adjacent parts being shown in vertical section;

Fig. 2 is a plan view of the air bearing, tube holder and fragmentary portions of the tube supporting arm, the means for rotating the tube being omitted;

Fig. 3 is a relatively enlarged plan view of a bearing air discharge ring of the preceding views, shown alone;

Fig. 4 is an enlarged fragmentary vertical sectional view of the air discharge ring and adjacent parts of the structure shown in Fig. 1;

Fig. 5 is a further enlarged fragmentary sectional view along the line 5—5 of Fig. 4;

Fig. 6 is a view like Fig. 1 but showing a modified form of air bearing applied to a holder for a rotary refractory tubular member of a different type;

Fig. 7 is a fragmentary horizontal sectional view substantially along the line 7—7 of Fig. 6;

Fig. 8 is a fragmentary vertical sectional view on line 8—8 of Fig. 7, showing in enlarged form a portion of the air bearing and associate parts of the Fig. 6 form of construction; and Fig. 9 is a plan view of the air discharge ring of the Fig. 6 form of construction, shown alone.

Referring now particularly to Fig. 1, the numeral 1 designates a tubular holder for a glass feeder tube 2, only a fragmentary upper end portion of which is shown. Tube 2 has an externally flanged upper end portion 2a resting in a suitably formed seat 3 in a relatively reduced lower end portion 1a of the holder 1. Suitable clamping means, indicated diagrammatically by dot-and-dash lines at 4, may be provided if desired or necessary to prevent accidental displacement of the tube 2 from its seat in its holder and to assure rotation of the tube 2 with the holder 1 when the latter is rotated about its vertical axis.

The holder 1 is anti-frictionally mounted in an annular bearing housing 5 which may be an integral part of a generally horizontal supporting arm 6. The supporting arm 6 is secured at one end by suitable clamping means 7 to the upper end of a vertical supporting shaft 8 which depends through a stationary bearing 9. Only the upper end portion of the shaft 8 is shown. In a complete feeder structure, such vertical supporting shaft is adjustably supported by suitable adjusting means (not shown) so that the arm 6 is suitably located to position the tube 2 depending therefrom in a predetermined operative position in a molten glass feeding container (not shown). The end of the arm 6 remote from the vertical shaft 8 may be positioned in guided engagement at 10 with a suitable projecting guide 11 on a vertical support 12. A motor 13 on the support 12 drives a sprocket 14. A chain 15 is trained about the sprocket 14 and about an annular sprocket 16 which fits upon an external flange 17 on the upper end of the holder 1 and is rigidly secured thereto by cap screws 18 or in any other suitable known manner. When the holder 1 is rotatably mounted in the bearing housing 5, as by bearing means of the invention as hereinafter described, operation of the motor 13 will drive the chain 15 and effect rotation of the holder 1 and the tube 2 carried thereby about their common vertical axis.

The novel bearing means of the present invention in the form shown in Fig. 1 comprises an air discharge ring 19 held in the bearing housing 5 directly beneath the flange 17 on the upper end of the holder 1. The air discharge ring 19 preferably has a flat upper surface 20 of about the same outer diameter as the overlying lower surface of the flange 17, such lower surface also being flat as indicated at 21. The air discharge ring 19 has a cylindrical inner peripheral wall 22 fitting closely around but spaced slightly outward from the outer peripheral surface of the portion of the tubular holder 1 within the ring 19 when the holder 1 is centered in the housing 5 with its flange 17 overlying the air discharge ring. The top surface 20 is normal to the inner peripheral wall 22 of the air discharge ring 19 in the example shown. The bottom surface, indicated at 23, of the ring 19 may be parallel to the top surface 20. The outer peripheral wall 24, may be parallel to the cylindrical inner peripheral wall 22. These bottom and outer peripheral surfaces of the air discharge ring are suitable to make the ring fit snugly in a counterbore 25 in the annular housing 5 so that the ring rests upon an upwardly facing shoulder 25a at the bottom of the counterbore from the outer peripheral surface of the ring inwardly for a sufficient distance to stabilize the position of the ring in the housing.

The air discharge ring 19 has a circular internal bore or chamber 26 therein which may be supplied with cooling air through an intake port 27, Fig. 2, from a suitable supply pipe 28. Discharge of air from this chamber 26 at the top of the ring is through numerous jet holes 29 arranged in a circle in closely adjacent spaced relation in such top as best seen in Fig. 3, the upper ends of the jet holes 29 being counterbored and upwardly enlarging, as indicated at 30. With this arrangement, the air emerging from these top outlets 29, 30 will form a continuous cushion or film of air beneath the bottom wall 21 of the flange 17 on the upper end of the holder 1 which will support the holder for rotation about its axis relative to the air ring without frictional contact of its supported flange portion with the underlying top of the air discharge ring. I have found that a film of air .001 to .002 inches thick between the top of the air discharge ring and the tube holder flange will permit the holder to rotate freely on such air cushion without friction between the relatively rotating undersupported and supporting parts.

The holder 1 may be maintained centered in the bearing air discharge ring 19 by air discharged from the ring through suitable jet holes in its inner peripheral wall. These jet holes are spaced angularly apart in a circular series as clearly shown in Fig. 3. Each comprises a relatively small inner, air intake end portion 31 and a larger, counterbored outer, air discharge portion 32. These tube centering air jet holes are closer together in the portion of the air discharge ring toward which the tubular holder tends to be pulled by its driving chain than on the opposite side of the air discharge ring. For example, the jet holes 31, 32 on the chain pull side may be spaced apart 6° as indicated for the left hand approximate third portion of the ring 19 in Fig. 3 while the jet holes 31, 32 for the remaining approximate two-thirds of the ring are spaced approximately 12° apart as shown in the same view. As indicated in Figs. 1 and 4, the jet holes 31, 32 may be inclined inwardly and upwardly from their inner to their outer enlarged ends.

Air supplied to the bore or chamber of the ring 19 from the supply pipe 28 may be obtained from any suitable source of supply. It has been found in tests that an air pressure of three pounds inside the air discharge ring is sufficient to support as much as fifty pounds in addition to the tube holder and its supported tube and to resist satisfactorily a chain pull of approximately thirty pounds while the tube holder is floating free and rotating without rubbing. Air from the internal bore or chamber of the ring 19 passes upwardly through the supporting air jet holes 29, 30 to form a series of air cushions merging into a continuous film of air between the top of the ring and the overlying holder flange. Air may bleed from this film to the atmosphere through a narrow annular outlet 33 which may be provided by slightly enlarging the upper portion of the inner wall of the annular bearing housing 5 around the upper portion of the ring 19.

Air passing from the interior of ring 19 through the centering air jet holes 31, 32 will maintain the encircled portion of the holder within the ring approximately centered in the ring. Air of the centering film and in the outer enlarged ends of the centering jet holes at the chain pull side of the ring will be compressed to offer an increased resistance as the chain tends to pull the holder toward that side of the ring. At the opposite side of the air discharge ring, the chain pull tends to open up the air film and to release pressure from the enlarged discharge ends of the jet holes 31, 32. Some air from the space between the ring 19 and the encircled portion of the holder may pass into the upper space between the top of the air ring and the supported holder flange. Air passing downwardly in such space and out of the bottom thereof as indicated by the direction arrow 34 in Fig. 4 may escape to the atmosphere through an annular space 35 between the bottom of the housing 5 and the adjacent portion of the holder 1.

The air supplied to and discharged from the air ring 19 also efficiently cools the tube holder and the air ring. It has been found that approximately 12½ cubic feet of air per minute will satisfactorily operate this air bearing and also cool the tube holder and air ring. This is just about the amount of free air heretofore used for ball bearing cooling alone in a commercial feeder having a rotating tube supported by such a bearing.

If desired, a pressure switch of any suitable known type may be installed in the air supply system to shut off the motor for driving the rotating tubular holder in the event of air supply failure.

In the embodiment of the invention shown in Fig. 6, a substantially horizontal supporting arm 36 is supported at 37 near one of its ends on an upright support 38 and is retained at its opposite end at 39 by a projecting retaining element 40 on a stationary support 41. The supporting arm 36 is formed intermediately to provide an annular housing 42 in which a bearing air discharge ring 43 is set.

The air discharge ring 43 is provided with a series of angularly spaced jet holes in its top wall 44, each of these jet holes comprising a small diameter lower air intake portion 45 and an inlarged flaring upper air discharge portion 46, as clearly shown in Fig. 8. The air discharge ring 43 is provided with an air inlet port 47 with which a pressure air supply pipe 48 is operatively connected so as to supply air at the desired pressure and in the desired amount to an internal chamber 49 in the ring 43. Overlying the ring 43 is an outwardly extending flange 50 on the upper end portion of a tubular main holder 51 for a refractory tube 52.

The refractory tube 52 comprises a series of segmental sections 52a, see Fig. 7, each having an outwardly turned flange 53, Fig. 6, at its upper end held in a seat 54 in its individual tube segment holder, generally indicated at 55. These tube segment holders are arranged in a circular series and rest in a seat 56 in a reduced lower end portion 57 of the holder 51. The holder assembly thus supports the refractory tube on the ring 43 for rotation relative to the latter on an air film supplied by the ring as presently will be explained.

An annular sprocket 58 is fastened in place on the top of the holder 51, as by cap screws 59, and is driven by a chain 60 operatively connecting this sprocket with a drive sprocket 61, Fig. 6.

The holder assembly of the embodiment of the invention shown in Fig. 6 may be kept centered in relation to the bearing air discharge ring 43 by a plurality of angularly spaced centering rollers 62 mounted on the arm 36 to bear against the outer periphery of the flanged upper end portion of the holder 51 as shown by Figs. 6 and 7 together.

The operation of the form of the invention shown in Fig. 6 is substantially like that of the Fig. 1 form of the device except for the centering of the refractory tube holder. A supporting film of air will be provided between the top of the air ring and the overlying supported portion of the tubular main holder 51 so that the holder assembly and the refractory tube supported thereby will rotate freely and without friction in the bearing housing and in relation to the air discharge ring.

If desired, a vertical cleanout opening 63 may be provided in a portion of the outwardly enlarged or flanged upper portion of the main holder 51 on the same radius as that of each of the supporting air jet holes in the air ring and may be aligned with such jet holes successively when the holder assembly is turned by hand with the motor off. A suitable cleaning wire may then be inserted through the cleanout opening 63 into and through each underlying jet hole to clear it from dirt or gum in the air supply.

Various modifications of and changes in the illustrative embodiments of the invention herein described will now be apparent to or readily occur to those skilled in the art and I therefore do not wish to be limited to the details of these embodiments.

I claim:

1. The combination with a rotary vertical tubular member having an externally enlarged upper portion, of an air bearing for said member, said air bearing comprising a hollow ring occupying a relatively fixed position surrounding a portion of the tubular member directly beneath its externally enlarged portion and sufficiently larger than the surrounded portion of the tubular member to permit the latter to rotate freely about its vertical axis in the ring, said ring having a circular series of spaced closely adjacent jet holes in its top opening directly beneath the externally enlarged upper portion of the tubular member for the discharge of air under pressure to form a film of air between the top of the ring and the overlying outwardly enlarged portion of the tubular member to support the latter for rotation about its axis relative to the ring without frictional contact with the top of said ring, means to supply air under pressure to the interior of said ring, means including a flexible driving element operatively associated with the rotary tubular member to rotate the latter about its axis and relative to said ring in such manner as to tend to pull the tubular member laterally toward one side of said ring, and means acting on the tubular member at a plurality of angularly spaced places around its periphery to maintain said tubular member approximately centered in said ring during rotation thereof despite the lateral pull thereon.

2. The combination defined by claim 1 wherein said last named means comprises angularly spaced jet holes in the inner peripheral wall of said ring around the surrounded portion of said tubular member for discharge of air under pressure from the interior of the ring against the periphery of said surrounded portion of the tubular member, said last named jet holes being relatively more numerous and closer angularly together in the portion of said ring toward which the rotating means for the tubular member tends to pull the tubular member than in the opposite portion of said ring, whereby to maintain the tubular member spaced from the inner wall of the ring at all points therearound despite the pull of the rotating means on the tubular member toward one side of said ring.

3. An air bearing as defined by claim 2 wherein said jet holes in the inner peripheral wall of said ring are inclined upwardly toward their outer discharge ends.

4. An air bearing as defined by claim 1 wherein said last named means comprises a plurality of vertical rollers located at angularly spaced relatively fixed positions around and in contact with the outer periphery of a portion of said rotary tubular member.

5. The method of rotatably supporting a vertical tubular member having an externally enlarged upper portion which comprises discharging jets of air under pressure upwardly against the under surface of said externally enlarged portion of the tubular member at numerous closely adjacent angularly spaced points in a circle directly therebeneath to provide a supporting film of air therefor and applying numerous inwardly directed jets of air spaced angularly in a circle closely surrounding a portion of said tubular member against the outer periphery thereof to maintain said tubular member approximately centered in relation to said circle of upwardly directed jets and so that relatively more inward jets and greater air pressure are applied per unit of arcuate extent to the portion of the outer periphery of the tubular member at the side of said circle toward which said tubular member tends to move laterally under pull from a means for rotating it than to the opposite portion of said periphery.

WILLIAM T. HONISS.

REFERENCES CITED

The following references are of record in the file of this patent:

UNITED STATES PATENTS

| Number | Name | Date |
|---|---|---|
| 1,906,715 | Penick | May 2, 1933 |
| 2,354,296 | Arms | July 25, 1944 |
| 2,379,405 | Armitage | July 3, 1945 |
| 2,502,173 | Potts | Mar. 28, 1950 |